(12) United States Patent
Tuovinen et al.

(10) Patent No.: US 8,984,128 B2
(45) Date of Patent: Mar. 17, 2015

(54) EVALUATION OF PAGE LOAD PERFORMANCE OF WEB BROWSER

(71) Applicant: Rightware Oy, Espoo (FI)

(72) Inventors: Jouni Tuovinen, Helsinki (FI); Teemu Uotila, Espoo (FI)

(73) Assignee: Rightware Oy, Espoo (FI)

( * ) Notice: Subject to any disclaimer, the term of this patent is extended or adjusted under 35 U.S.C. 154(b) by 274 days.

(21) Appl. No.: 13/668,391

(22) Filed: Nov. 5, 2012

(65) Prior Publication Data

US 2014/0129697 A1    May 8, 2014

(30) Foreign Application Priority Data

Nov. 4, 2012 (EP) .................................... 12191185

(51) Int. Cl.
    *G06F 15/173* (2006.01)
    *H04L 12/26* (2006.01)
(52) U.S. Cl.
    CPC .................................. *H04L 43/106* (2013.01)
    USPC ........... 709/224; 709/206; 709/223; 709/225; 709/226
(58) Field of Classification Search
    None
    See application file for complete search history.

(56) References Cited

U.S. PATENT DOCUMENTS

| 7,461,369 | B2 * | 12/2008 | Zhao et al. ..................... 717/131 |
| 7,783,719 | B2 * | 8/2010 | Miller ............................ 709/217 |
| 7,849,183 | B1 | 12/2010 | Haber et al. |
| 8,266,281 | B1 | 9/2012 | Carlson et al. |
| 8,392,578 | B1 * | 3/2013 | Donovan et al. .............. 709/227 |
| 2002/0099818 | A1 | 7/2002 | Russell et al. |
| 2007/0260736 | A1 * | 11/2007 | Miller ............................ 709/227 |
| 2008/0133739 | A1 * | 6/2008 | Zuzga et al. ................... 709/224 |
| 2011/0202608 | A1 * | 8/2011 | Nassar et al. .................. 709/206 |

* cited by examiner

*Primary Examiner* — Brian P Whipple
(74) *Attorney, Agent, or Firm* — Seppo Laine Oy; Joshua P. Wert

(57) ABSTRACT

A new method and computer program for evaluating page load performance of a web browser is presented. The evaluation method comprises obtaining a first browser timestamp from the web browser when the web browser starts a page process in order to load a page from the server. Further, the method comprises obtaining at least one intermediate timestamp associated with an intermediate stage during the page load. The intermediate timestamp can be for example a second browser timestamp, a first server timestamp or a second server timestamp. After that, a third browser timestamp is obtained from the web browser when the web browser completes the page load. The obtained timestamps are used for calculating a first and second page load performance parameters relating respectively to a first and second technical aspect of the page load performance.

15 Claims, 5 Drawing Sheets

EVALUATION OF PAGE LOAD PERFORMANCE OF WEB BROWSER

TECHNICAL FIELD

The invention relates to methods and systems for testing and measuring performance of web browsers in loading web pages.

BACKGROUND

Web browsers page load is a critical area when using the internet to search for information.

US 2008/0133739 A1 discloses a method for response time benchmarking. According to the US publication, a benchmark response time is determined for a browser application request sent to a network server over a network. The response time is determined by performance monitoring code that is loaded into and monitors the browser application from the client. The performance monitoring code automatically sends a request to a network server; the request is not sent in response to user input. The network server receives the request, generates a response and provides the response to the browser application. The response includes a fixed amount of randomly generated data. The browser application receives and processes the response, but does not display the bytes or change the content displayed in the browser application as a result of the response. The browser application sends the times at which the browser application sends the request and the browser application completes processing the response data to the network server for further processing.

The technology described in US 2008/0133739 A1 is suitable at least for benchmarking the overall response times and server performance. There are also several methods that have been developed for benchmarking the performance of internet connections. However, there remains a need for more developed benchmarking methods that can even better distinguish between different sources of lag, delays and errors.

SUMMARY OF THE INVENTION

It is an object of the present invention to create a new method and computer program for evaluating page load performance of a web browser.

According to an aspect of the invention, these objects are achieved by providing a server and an application program for a user terminal that communicate with each other to perform an evaluation method.

According to an aspect of the invention, the evaluation method comprises obtaining a first browser timestamp from the web browser when the web browser starts a page process in order to load a page from the server. Alternatively, the timestamp can be created at a phase just before or immediately after starting the page process. However, the first browser timestamp associated with the web browser starting a page process in order to load a page from a server. Further, the method comprises obtaining at least one intermediate timestamp associated with an intermediate stage during the page load. The intermediate timestamp can be for example a second browser timestamp, a first server timestamp or a second server timestamp. After that, a third browser timestamp is obtained from the web browser. The third browser timestamp is associated with the web browser completing the page load whereby the page process ends. The association corresponds to that of the first browser timestamp, and the other timestamps as well. Thus, the timestamp is created at a certain phase of the process that is closely linked to the relevant moment.

According to the method, the obtained timestamps are used for calculating a first and second page load performance parameters relating respectively to a first and second technical aspect of the page load performance. The first page load performance parameter is calculated on the basis of a first set of at least two of said obtained timestamps whereas the a second page load performance parameter is calculated on the basis of a second set of at least two of said obtained timestamps, such that the second set is least partially different than the first set.

The present invention makes it possible to provide a new server that can be connected from a user terminal to evaluate page load performance of a web browser, or a plurality of different web browsers, installed on the user terminal.

The present invention provides also an application program to be run on the user terminal for the purposes of performing a method for evaluating the page load performance of a web browser, or a plurality of different web browsers, installed on the user terminal.

Hence, the invention has embodiments that allow, for example, testing different web browsers in order to select a web browser that is most effective in the particular user terminal, i.e. in the particular hardware and software setup used by the user.

BRIEF DESCRIPTION OF DRAWINGS

For a more complete understanding of the present invention and the advantages thereof, the invention is now described with the aid of the examples and with reference to the following drawings, in which.

DETAILED DESCRIPTION OF EXEMPLARY EMBODIMENTS

Various embodiments, one of which is called Browsermark, are discussed in the description below. Browsermark is designed to benchmark a browsers' performance capabilities in multiple ways. Page load testing can be a part of a more extensive testing suite.

Page load benchmarking executed within a product evaluates in different ways how current browsers operate when loading a page.

Presently, some web developer assistant tools aim to measure certain page loading speeds or network connection speeds. However, none of the existing solutions are capable of testing specific user and browser page load speeds in general.

According to an embodiment of the present invention there is a test, which is referred to herein as JavaScript page, which uses iFrame with a random query string. The JavaScript is then capable of generating a page in which it is possible to carry out benchmarking.

According to certain examples, the HEAD contains a JavaScript (JS) link to a JS page as well as a random query string. Because JS is static it is possible for a Browser to cache the page.

Furthermore, the BODY can contain, for example, three elements which are evaluated:
1. Was the PHP page uncached?
2. Was the Cascading style sheets (CSS) page uncached?
3. Did the called IS page receive the query string correctly?

The BODY can also contain material, for example, images, text and regular web page content which is not evaluated. However, the non-evaluated material will create a slightly higher load time for the purpose of discovering differences in caching. Therefore, according to certain examples, it is advantageous to limit the amount of unevaluated material in the BODY for the purposes of benchmarking caching.

According to certain examples of the present invention, internal scoring is measured in microseconds. If some of the BODY tests fail, then the failures will increase the millisecond count and weaken the internal score. Therefore, it is advantageous in certain examples to perform a check on the BODY to minimize or eliminate BODY test failures prior to determining a final internal score. Additionally, if an internal score is determined which falls outside of predetermined expected parameters then the system may check the number of BODY test failures. If the number of BODY test failures is above a predetermined limit then the internal score may be, for example, recalculated, modified or discarded.

Before submitting some, or any, results, predetermined comparison values can be modified by the internal scoring, e.g. the milliseconds result.

Figure 1:
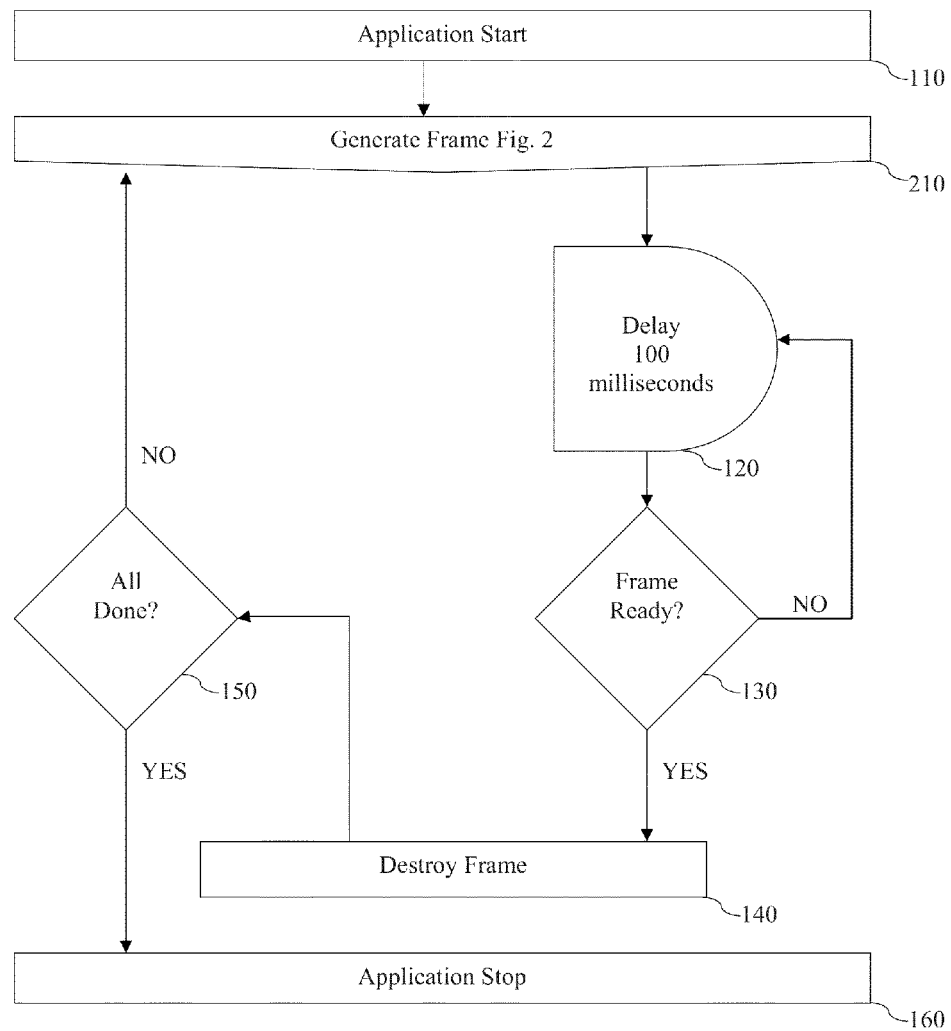
FIG. 1 describes an application general flow while processing browser page load speed according to an embodiment.

FIG. 1 illustrates a general example workflow for Page Load benchmarking utilizing a method and application according to an embodiment of the present invention. The word "application" refers herein to an application program executable by a user terminal running a web browser program to be evaluated. The application is preferably downloadable from, for example the cloud, a removable drive or a server for providing the Page Load benchmark At step 110, the application starts and at step 160 the application stops. At step 210, a frame is generated. Generating frame 210 will be described in more detailed level below with reference to FIG. 2. Step 120 applies a delay of 100 milliseconds. Step 130 checks if the flame is ready or not. If the frame is not ready, it is decided at step 130 to iterate back to step 120. By ready it is meant that page has loaded completely. If everything has been executed according to test, step 130 decides to advance to step 140. Step 140 terminates the created frame and advances to step 150, where a decision is made whether everything was executed properly. If yes, the application will move to process step 160 wherein the application stops. If the answer at step 150 is no, the application will be moved to process step Application Start 110.

Figure 2:
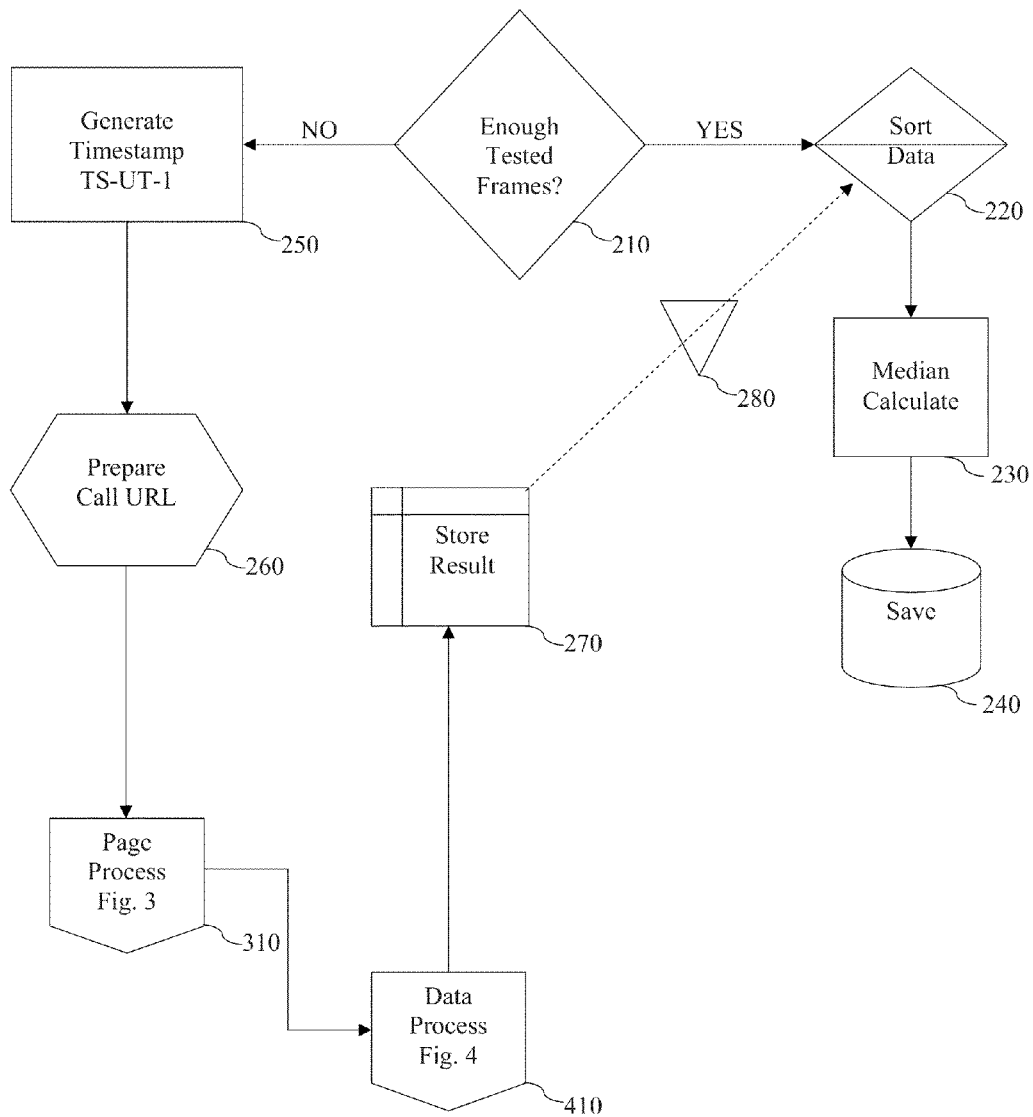
FIG. 2 illustrates how application generate frame for measurements and how data is handled according to an embodiment.
Figure 3:
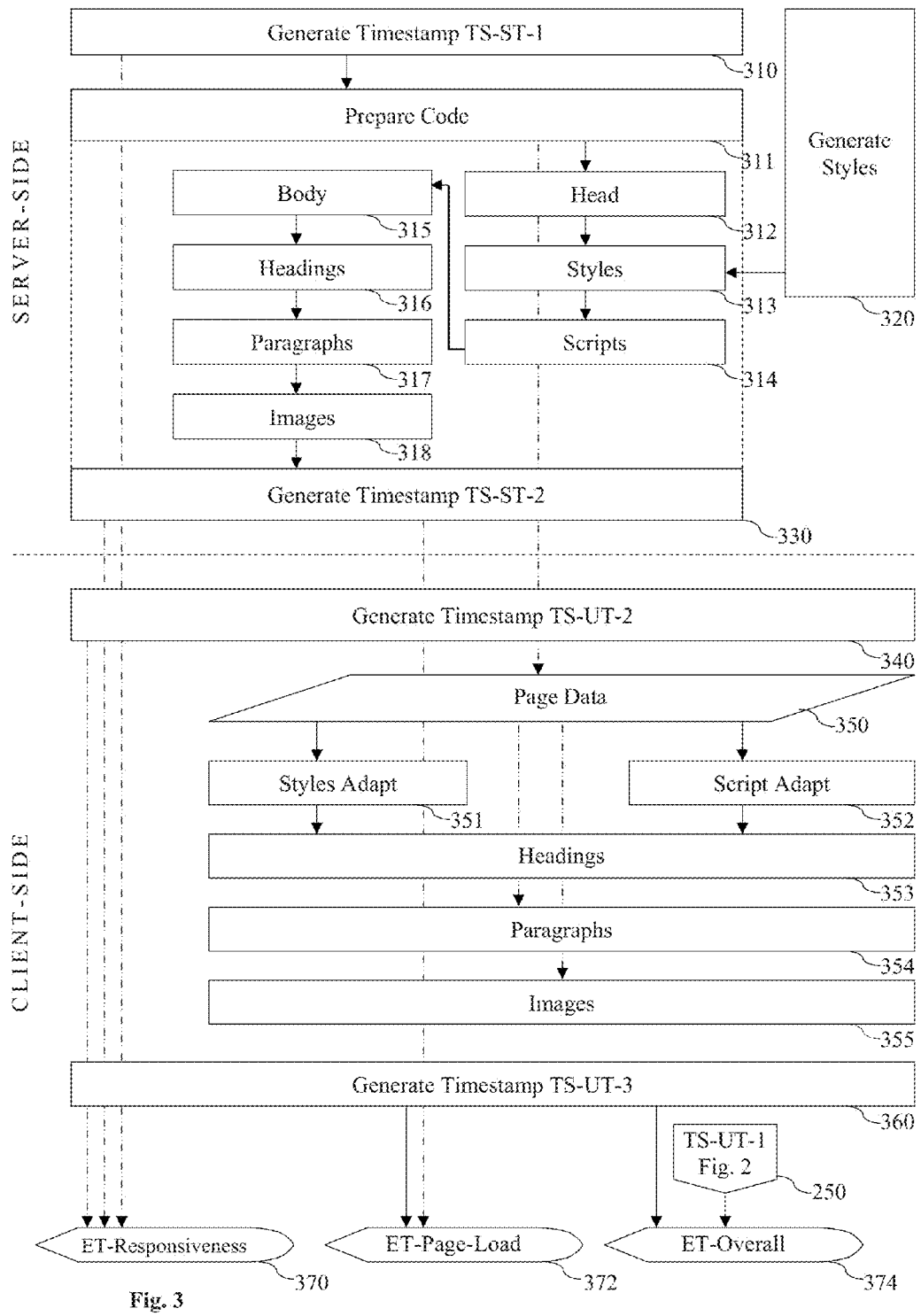
FIG. 3 shows, in accordance with an embodiment, page process in general, at top parts that are created Server Side and at bottom parts that are handled Client Side.

FIG. 2 shows one possible example construction of the generate frame step 210 of FIG. 1 in more detail. First it is decided whether there are enough frames. If yes, the generate frame process moves to step 220. If no, the generate frame process moves to step 250. At step 220, a sort data decision is made and the generate frame process continues to step 230 where a median calculation process segments are made. After calculating medians, the performance numbers are saved at step 240. If there was an issue, such as network connection failure or a technical error in the web browser, and a number of tested frames wasn't great enough, the generate frame process reverts to step 250. Step 250 creates a user time timestamp before the page is processed. When the timestamp is created, step 260 prepares a URL call. After the URL call is successful, the generate frame process continues to step 310, which will be described in more detail with reference to FIG. 3 below. After the Page process, which is described with regards to FIG. 3, is completed, a Data process will commence at step 410. Data process 410, which is an off-page connector, will be described at a more detailed level in FIG. 4. Once step 410 is completed, a Store Result process 270 is initiated. The Store Result process 270 is a segment wherein internal storage is used. The stored results are then merged at step 280 and transferred to sort data decision step 220, and the generate frame process will continue as described earlier until the status is saved at step 240.

FIG. 3 shows one possible example construction of the Page process according to an embodiment of the present invention. In the present example there are two clear separate sides, as shown in FIG. 3, a back-end, which is referred to herein as a server-side, and a front-end, which is referred to herein as a client-side. While the two clear separate sides are shown herein, one of ordinary skill in the art will recognize examples of the present invention in which the division is not as described with regards to the present example but which none the less falls within the scope of the present disclosure.

Step 310 generates a timestamp TS-ST-1 (server-time). This step is performed once the Server-Side Page Process starts. From step 310, the Page process flow continues to step 311, which prepares the code in question. Step 312 starts after step 311 is finalized. Step 312 creates a header, which is the top rectangular shaped area that runs across the top of the web page on a screen. Once head is defined at step 312, the process moves to step 313, in which Styles are applied. A style sheet is a form of separation for web design, where the markup language is HTML. External Styles used here are in CSS style sheet language format. Flow continues to step 314, which is Scripts section. Scripting language used in step 314 is JavaScript, which is a general-purpose client-side scripting language. Step 315 creates a body element, where the page load performance test content is defined. Once the body elements are handled, step 316 defines headings which divide the content within the document. Step 317 defines paragraphs within the body content and step 318 defines images within the content page. Step 320, which is a style generation process, commences parallel to step 310-318 operations and information from step 320 sub-process is provided to the sub-process at step 313. Step 320 communicates to step 313 when step 320 has finished all the necessary processing so that information about styles can be provided accordingly to step 313. At step 330, a timestamp TS-ST-2 (server-time) is created when Server-Side Page Process ends. The timestamp from step 330 is then recorded.

Client-side starts the process at step 340 once step 330 has ended. Step 340 generates a timestamp TS-UT-2 when Client-Side Page Process Document Object Model (DOM) is done. Then, at step 350, page data I/O executes itself parallel to step 311. Client-side will adapt Styles at step 351 and Scripts at step 352 to fit into proper dimensions. Headings at step 353, Paragraphs at step 354, and Image at step 355 are also handled in parallel to steps 310-330. Timestamp IS-UT-3 is created at step 360 once the client-side page process window load has been completed so that this completion is associated with this timestamp on client-side.

At step 370, timestamps are gathered from the sub-processes at steps 310, 340 and 360 for calculating a responsiveness. At step 372, timestamps are gathered from the sub-processes at steps 330 and 360 for calculating a page load time. In addition, at step 374, timestamps are gathered from the sub-processes at steps 250 and 360 for calculating the overall elapsed time, which can be used also to check the correctness of other calculations.

The time-stamps mentioned above and shown in FIG. 2 and FIG. 3 are summarized in the Table 1 below. Table 1 specifies also equations that are used in the described embodiment to calculate the first and second page load performance parameters relating to the first and second technical aspect of the page load performance of the web browser. In the embodiment, these parameters are ET-Responsiveness obtained from step 370 and ET-Page-Load obtained from step 372. In addition, Table 1 presents also an equation that is used in the described embodiment to calculate Overall Elapsed Time obtained from step 374.

| | Timestamps (TS) and Elapsed Times (ET) | |
|---|---|---|
| TS-UT-1 | FIG. 2 | Timestamp User-Time 1: created before Page Process FIG. 1-1 |
| TS-ST-1 | FIG. 3 | Timestamp Server-Time 1: created when Server-Side Page Process starts |
| TS-ST-2 | FIG. 3 | Timestamp Server-Time 2: created when Server-Side Page Process ends |
| TS-UT-2 | FIG. 3 | Timestamp User-Time 2: created when Client-Side Page Process Document Object Model is done |
| TS-UT-3 | FIG. 3 | Timestamp User-Time 3: created Client-Side Page Process Window Load is done |
| ET-Overall | FIG. 3 | Overall Elapsed Time: TS-UT-3 − TS-UT-1 |
| ET-Responsiveness | FIG. 3 | Responsiveness Elapsed Time: TS-UT-2 − (TS-ST-2 − TS-ST-1) − TS-UT-1 |
| ET-Page-Load | FIG. 3 | Page Load Elapsed Time: TS-UT-3 − TS-UT-2 |

Figure 4:
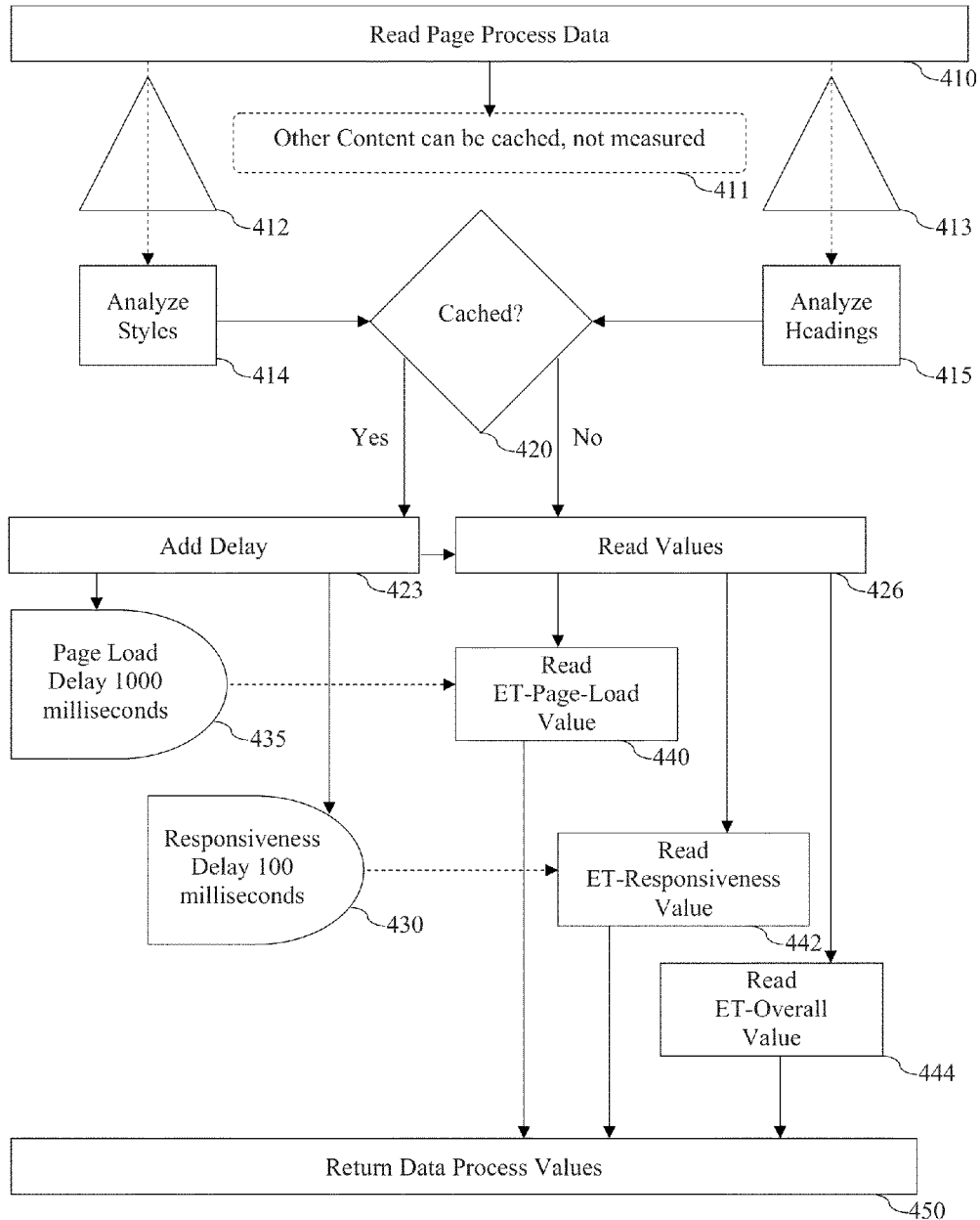
FIG. 4 is a flowchart of data processing according to an embodiment wherein page data is processed and analyzed before values are sent back to a main analyze application.

FIG. 4 describes in more detail a data process flow in read page environment. At step 410, Read Page Process Data sub-processes is started. Step 411 allows other content to be cached, but these are not measured however. Steps 412 and 413 start parallel sub-processes, where analysis of Styles at step 414 and analysis of Headings at step 415 are executed simultaneously. Information from these parallel steps is then submitted to step 420, where a check is made whether a prohibited caching has occurred. If caching contrary to prohibition is found, Add Delay step 423 is performed. Step 423 activates step 430, which adds an additional delay of 100 milliseconds, for instance, on the calculations of the responsiveness value so that erroneous operation of the web browser is correspondingly reflected in the obtained page load performance parameter relating to the technical aspect of the page load performance. Step 423 also activates step 435, which adds an additional delay of 1000 milliseconds, for instance, on the calculations of the page load value so that erroneous operation of the web browser is correspondingly reflected also in this parameter. Then, step 426 starts reading of the values and activates reading steps of 440, 442 and 444. After the values are read, the information is sent to step 450, which defines Return Data Process Values. Step 450 summarizes all the values and gives out the performance information.

Figure 5:
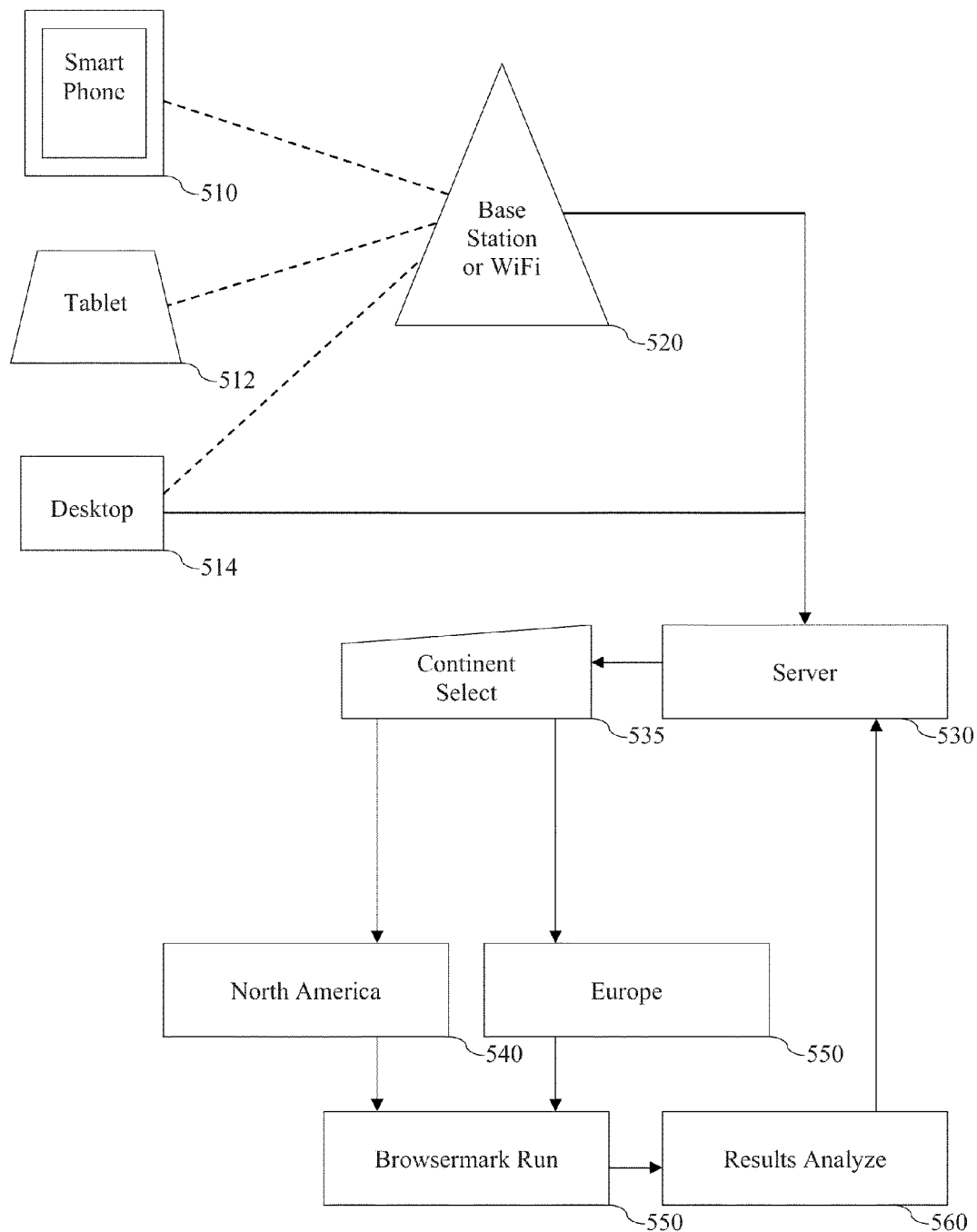
FIG. 5 is a general description according to an embodiment about how users with different devices come to a Server and process with continents server they select.

FIG. 5 describes the generic functionality of the above embodiments within Browsermark product and how information is gathered and benchmark runs executed in a real-world situation. Devices 510, 512 and 514 are specified devices where Browsermark is intended to run. Devices however can scale out of these predefined environments and benchmarking software can be run on any device which has a web browser that follows for example HTML or HTML5 standards. Devices 510, 512 and 514 are connected either through wireless connection or through cable to a dedicated server 530. Step 535 allows the user to select a nearest server to be used in the test. In the example, choice can be made between North America and Europe. However, the server base may be increased if needed to. Server 540 is North American server and server 550 is European server. After the server has been selected, step 550 will commence, which is the actual benchmark run, and after successful benchmark execution the results will be analyzed and shown at step 570, which provides the overall testing summary page. After summary, user can revert back to server 530 and run benchmark once again using the selected server.

According to an embodiment, the method comprises:

obtaining a first browser timestamp from the web browser, the first browser timestamp being associated with the web browser starting a page process in order to load a page from a server;

obtaining at least one intermediate timestamp associated with an intermediate stage during the page load, the at least one intermediate timestamp comprising at least one of a second browser timestamp, a first server timestamp and a second server timestamp; and obtaining a third browser timestamp from the web browser, the third browser timestamp being associated with the web browser completing the page load whereby the page process ends;

calculating a first page load performance parameter relating to a first technical aspect of the page load performance, wherein the first page load performance parameter is calculated on the basis of a first set of at least two of said obtained timestamps; and calculating a second page load performance parameter relating to a second technical aspect of the page load performance, wherein the second page load performance parameter is calculated on the basis of a second set of at least two of said obtained timestamps, the second set being least partially different than the first set.

According to an embodiment, the first browser timestamp can be the timestamp TS-UT-1, the second browser timestamp can be the timestamp TS-UT-2, the first server timestamp can be the timestamp TS-ST-1, the second server timestamp can be the timestamp TS-ST-2, and/or the third browser timestamp can be the timestamp TS-UT-3.

According to an embodiment, the at least one intermediate timestamp comprises a second browser timestamp associated with a moment when a Client-Side Page Process Document Object Model is ready.

According to an embodiment, the at least one intermediate timestamp comprises:

a first server timestamp associated with a moment when a Server-Side Page Process starts; and a second server timestamp associated with a moment when a Server-Side Page Process ends.

According to an embodiment, the first page load performance parameter relates to a responsiveness of the web browser, and the first set is formed by the first browser timestamp, the second browser timestamp, the first server timestamp and the second server timestamp.

According to an embodiment, the second page load performance parameter relates to an actual page load time by the web browser, and the second set is formed by the second browser timestamp and the third browser timestamp. The actual page load time refers here to a portion of the page load time spent by the web browser in loading the page during the page process.

According to an embodiment, the method comprises performing several consecutive page processes.

According to an embodiment, the method comprises calculating at least one benchmark value for the web browser on the basis of the first page load performance parameters and/or the second page load performance parameters obtained from the several consecutive page processes.

According to an embodiment, the page contains dynamic elements and static elements and the server amends the dynamic elements such that they differ between the consecutive page processes, the static elements remaining unchanged between the consecutive page processes.

According to an embodiment, the dynamic elements include at least two of styles, headings and paragraphs, and the static elements include images and scripts.

According to an embodiment, the dynamic elements include two elements from the group consisting of styles, headings and paragraphs, the remaining one element of the group being a static element.

According to an embodiment, the static elements contain a pseudo-dynamic element having a static content that remains unchanged between consecutive page processes and a name, the method comprising the server amending the name such that it differs between the consecutive page processes.

According to an embodiment, the pseudo-dynamic element is an image.

According to a further embodiment, the static elements contain several the pseudo dynamic elements.

According to an embodiment, the server prohibits the web browser from caching the dynamic elements According to an embodiment, the method comprises making a check whether the web browser cached a dynamic element contrary to a prohibition by the server. If prohibited caching occurred, the method further comprises applying an addition delay when calculating at least one of the page load performance parameters. Thus, a prohibited caching results in a lower score in the test.

According to a further embodiment, there is provided a method of evaluating page load performance of a web browser by means of a computer program, the method comprising:

obtaining browser timestamps from the web browser, the browser timestamps being associated with at least two different phases in a page process;

calculating a responsiveness of the web browser on the basis of a first set of at least two of said obtained timestamps; and calculating an actual page load time by the web browser on the basis of a second set of at least two of said obtained timestamps.

According to an embodiment, there is provided a computer program product for instructing a user terminal to participate in any one of the above described methods or their combination.

According to an embodiment, the computer program product comprises program code means for instructing the user terminal to:

obtain a first browser timestamp from the web browser, the first browser timestamp associated with the web browser starting a page process in order to load a page from the server;

obtain a second browser timestamp from the web browser, the first browser timestamp associated with an intermediate stage during the page load;

obtain a third browser timestamp from the web browser, the third browser timestamp associated with the web browser completing the page load whereby the page process ends; and communicate the obtained browser timestamps to the server for page load performance calculations.

According to an embodiment, the computer program product, sometimes called as an application, is downloadable from the server mentioned in the specification and claims.

According to an embodiment, the server is configured to participate in performing the method according to any one of embodiments described above, or any combination thereof.

According to an embodiment, the server is configured to
 receive a first browser timestamp from the web browser, the first browser timestamp associated with the web browser starting a page process in order to load a page from the server;

obtain at least one intermediate timestamp associated with an intermediate stage during the page load, the at least one intermediate timestamp comprising at least one of a second browser timestamp received from the web browser, a first server timestamp obtained from the server and a second server timestamp obtained from the server;

receive a third browser timestamp from the web browser, the third browser timestamp associated with the web browser completing the page load whereby the page process ends;

calculate a first page load performance parameter relating to a first technical aspect of the page load performance of the web browser, wherein the first page load performance parameter is calculated on the basis of a first set of at least two of said Obtained timestamps;

calculate a second page load performance parameter relating to a second technical aspect of the page load performance of the web browser, wherein the second page load performance parameter is calculated on the basis of a second set of at least two of said obtained timestamps, the second set being least partially different than the first set; and display at the web page at least one benchmarking value based on at least the first page load performance parameter and the second page load performance parameter.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of evaluating page load performance of a web browser by means of a computer program, the method comprising the computer implemented steps of:
   obtaining a first browser timestamp from the web browser, the first browser timestamp being associated with the web browser starting a page process in order to load a page from a server;
   obtaining at least one intermediate timestamp associated with an intermediate stage during the page load, the at least one intermediate timestamp comprising at least one of a second browser timestamp, a first server timestamp and a second server timestamp; and
   obtaining a third browser timestamp from the web browser, the third browser timestamp being associated with the web browser completing the page load whereby the page process ends;
   calculating a first page load performance parameter relating to a first technical aspect of the page load performance, wherein the first page load performance parameter is calculated on the basis of a first set of at least two of said obtained timestamps; and
   calculating a second page load performance parameter relating to a second technical aspect of the page load performance, wherein the second page load performance parameter is calculated on the basis of a second set of at least two of said obtained timestamps, the second set being least partially different than the first set.

2. The method of claim 1, wherein the at least one intermediate timestamp comprises a second browser timestamp associated with a moment when a Client-Side Page Process Document Object Model is ready.

3. The method of claim 1, wherein the at least one intermediate timestamp comprises:
   a first server timestamp associated with a moment when a Server-Side Page Process starts; and
   a second server timestamp associated with a moment when a Server-Side Page Process ends.

4. The method according to claim 1, wherein the first page load performance parameter relates to a responsiveness of the web browser, and the first set is formed by the first browser timestamp, the second browser timestamp, the first server timestamp and the second server timestamp.

5. The method according to claim 1, wherein the second page load performance parameter relates to an actual page load time by the web browser, and the second set is formed by the second browser timestamp and the third browser timestamp.

6. The method according to claim 1, comprising performing several consecutive page processes.

7. The method of claim 6, comprising calculating at least one benchmark value for the web browser on the basis of the first page load performance parameters and/or the second page load performance parameters obtained from the several consecutive page processes.

8. The method of claim 6, wherein the page contains dynamic elements and static elements and the server amends the dynamic elements such that they differ between the consecutive page processes, the static elements remaining unchanged between the consecutive page processes.

9. The method of claim 8, wherein the dynamic elements include at least two of styles, headings and paragraphs, and the static elements include images and scripts.

10. The method of claim 8, wherein the dynamic elements include two elements from the group consisting of styles, headings and paragraphs, the remaining one element of the group being a static element.

11. The method according to claim 6, wherein the static elements contain a pseudo-dynamic element having a static content that remains unchanged between consecutive page processes and a name, the method comprising the server amending the name such that it differs between the consecutive page processes.

12. The method according to claim 6, wherein the server prohibits the web browser from caching the dynamic elements.

13. The method of claim 12, comprising:
   making a check whether the web browser cached a dynamic element contrary to a prohibition by the server; and
   if prohibited caching occurred, applying an addition delay when calculating at least one of the page load performance parameters.

14. A computer program product for instructing a user terminal to participate in performing a method of evaluating page load performance of a web browser when executed on the user terminal having a web browser in communication with a server, the computer program product comprising program code means stored on a computer readable medium for instructing the user terminal to:
   obtain a first browser timestamp from the web browser, the first browser timestamp associated with the web browser starting a page process in order to load a page from the server;
   obtain a second browser timestamp from the web browser, the first browser timestamp associated with an intermediate stage during the page load;
   obtain a third browser timestamp from the web browser, the third browser timestamp associated with the web browser completing the page load whereby the page process ends; and
   communicate the obtained browser timestamps to the server for page load performance calculations.

15. A server configured to participate in performing a method of evaluating page load performance of a web browser when requested from a user terminal having a web browser in communication with a web page at the server, the server being configured to:
   receive a first browser timestamp from the web browser, the first browser timestamp associated with the web browser starting a page process in order to load a page from the server;
   obtain at least one intermediate timestamp associated with an intermediate stage during the page load, the at least one intermediate timestamp comprising at least one of a second browser timestamp received from the web browser, a first server timestamp obtained from the server and a second server timestamp obtained from the server; and receive a third browser timestamp from the web browser, the third browser timestamp associated with the web browser completing the page load whereby the page process ends;

calculate a first page load performance parameter relating to a first technical aspect of the page load performance of the web browser, wherein the first page load performance parameter is calculated on the basis of a first set of at least two of said Obtained timestamps;

calculate a second page load performance parameter relating to a second technical aspect of the page load performance of the web browser, wherein the second page load performance parameter is calculated on the basis of a second set of at least two of said obtained timestamps, the second set being least partially different than the first set; and display at the web page at least one benchmarking value based on at least the first page load performance parameter and the second page load performance parameter.

* * * * *